United States Patent [19]
Banks, Jr.

[11] 3,851,724
[45] Dec. 3, 1974

[54] ACOUSTIC DAMPING STRUCTURES
[75] Inventor: Neill K. Banks, Jr., Gloucester, Mass.
[73] Assignee: Bomco, Incorporated, Gloucester, Mass.
[22] Filed: Feb. 25, 1974
[21] Appl. No.: 445,538

[52] U.S. Cl............................. 181/33 G, 181/33 A
[51] Int. Cl.............................................. E04b 1/84
[58] Field of Search.......... 181/33 A, 33 G, 33 GA, 181/33 K; 161/125, 130, 109, 110

[56] References Cited
UNITED STATES PATENTS
3,231,454  1/1966  Williams............................ 161/110
3,529,692  9/1970  Meier................................ 181/33 K
3,738,447  6/1973  Rose................................. 181/33 G FOREIGN PATENTS OR APPLICATIONS
763,436  12/1956  Great Britain.................... 181/33 G Primary Examiner—Richard B. Wilkinson
Assistant Examiner—John F. Gonzales

[57] ABSTRACT
An acoustic damping structure is provided consisting essentially of a flexible lead sheet bearing a plurality of concavities in one major surface thereof. Acoustic damping of a noise producing surface is accomplished by fixation of the damping structure thereto.

10 Claims, 2 Drawing Figures

ACOUSTIC DAMPING STRUCTURES

FIELD OF THE INVENTION

The present invention relates generally to acoustic damping structures and more particularly to sheet form acoustic damping structures adapted to quiet noisy surfaces.

The problem of noisy environments has become acute. Whether in the office environment where typewriters, copying machines, calculators, duplicators and other office equipment contribute substantially to the auditory discomfort of personnel; in large industrial complexes such as metal forming shops or chemical plants where materials handling equipments such as chutes, conveyors, tankage, hoppers, bag filters, compressors and the like are often principal noise producers and even in the home environment where various wares such as metal cabinetry, loudspeaker enclosures, refrigerators, air conditioners, humidifiers and the like can render substantial disquietude, it is important that means be provided for substantially reducing sound emissions from all manner of noisy equipments. One known method for accomplishing reductions in noise emissions is to apply an acoustic damping material to the surface of an offending ware, and particularly to the enclosure or housing thereof. The present invention represents a novel structural improvement in one such known acoustic damping material, lead sheet.

OBJECTS OF THE INVENTION

It is a principal object of the invention to provide a novel acoustic damping structure.

It is another object of the invention to provide, by structural modification, improved acoustic damping properties in sheet lead materials.

It is yet another object of the invention to provide improved physical properties in sheet lead materials.

It is still another object of the invention to provide a novel method for acoustic damping of noise emitting surfaces.

Other objects and advantages of the present invention will in part be obvious and will in part appear hereinafter.

GENERAL DESCRIPTION OF THE INVENTION

The novel acoustic damping structure of the invention is composed of a sheet lead material having two major opposed surfaces. One of said surfaces is provided with a plurality of concavities therein, each concavity having an area of at least about 0.01 inch$^2$ and the sum of the areas of said concavities being at least 30 percent of the total area of said major surface of the acoustic damping structure.

DETAILED DESCRIPTION OF THE INVENTION

Figure 1:
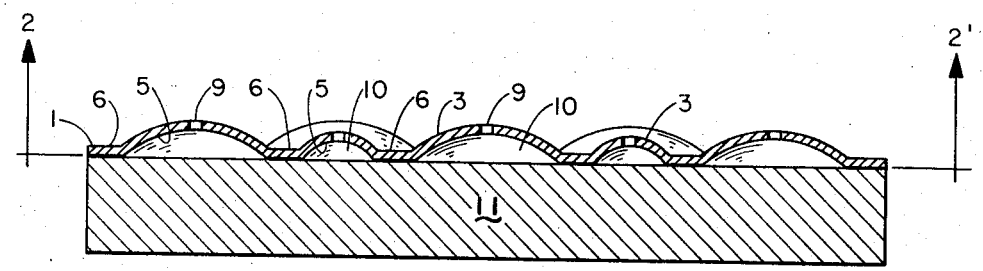
FIG. 1 is a longitudinal, schematic, diagrammatic view of a preferred embodiment of the acoustic damping structure of the invention shown affixed to a noise emitting surface.

Referring to the drawings, wherein like reference numerals represent like structural features, the acoustic damping structure of the invention consists essentially of a relatively thin lead sheet 1 having a plurality of concavities 5 formed into one of the major opposed surfaces thereof.

The sheet lead material constituting the material of construction of the acoustic damping structures of the invention should comprise at least 50% by weight of lead, thereby specifically to include within the ambit of the invention alloys of lead such as various of the somewhat hardened bullet and type metal alloys of lead. Preferably, in the interests of maximum softness, ductility, flexibility, low cost and acoustic damping efficiency, the sheet lead material employed will have a lead content of at least 90 percent by weight.

The thickness of the starting sheet lead material is subject to considerable variation. Effective acoustic damping structures for various applications can be produced from sheet lead having a thickness of from about 0.007 inch to as much as about 0.100 inch. Generally speaking, however, the acoustic damping structures of the invention should be as thin as possible consistent, of course, with competent performance in the intended end-use application. With respect to this last consideration, it is noteworthy that the acoustic damping efficiencies of the concavity-bearing acoustic damping sheet structures of the invention are generally greater, on an equal thickness basis, than plain sheet lead of similar composition. Thus, a further advantage prevalent in the use of the damping structures of the invention often resides in the ability to employ thinner sheet lead starting material to obtain sound damping performance equivalent to relatively thicker plain sheet lead materials. Obviously, the use of thinner structures to obtain equivalent sound damping performance also carries with it the further advantage of lighter weight and, to a smaller but nevertheless significant extent, smaller bulk and lower cost.

Figure 2:
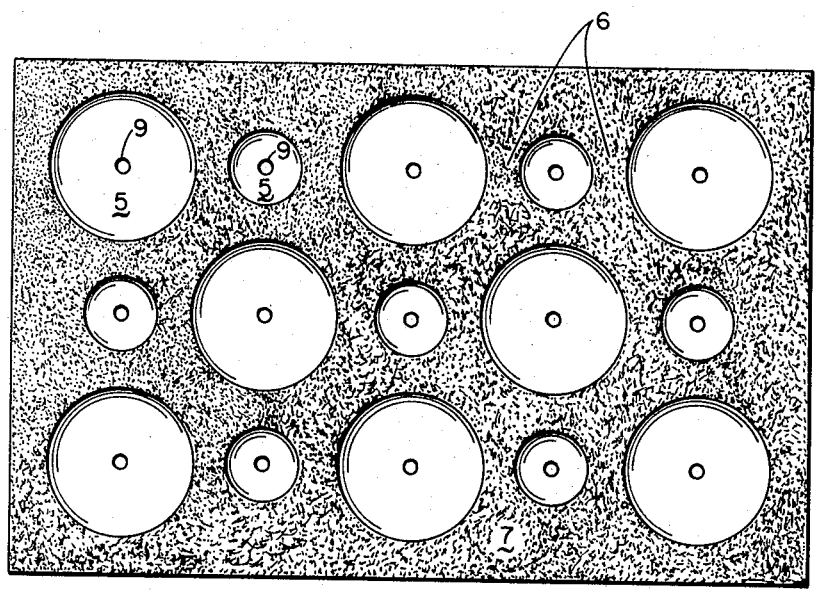
FIG. 2 is a schematic, diagrammatic, bottom plan view of the acoustic damping structure of FIG. 1 taken through line 2—2' thereof.

The depth of each concavity 5 is generally not critical provided, of course, that said depth is sufficient to provide a discrete space between the damping structure and the noise emitting surface to which it is applied. Further, the precise shape and area of each concavity 5 is also generally a matter of choice provided that each concavity have an area greater than about 0.01 inch$^2$ and provided that the sum of the areas embraced by the concavities is at least 30 percent and preferably at least 40 percent of the total area of the major surface of the acoustic damping sheet structure. Illustratively, therefore, for each square foot of the sheet form acoustic damping structure the sum of the areas of the concavities embodied therein should be at least about 43 square inches and preferably will be at least about 57 square inches. Thus, the sizes and/or shapes of concavities 5 may be essentially uniform or may be substantially different from one another. For instance, as depicted in the drawings, a preferred embodiment of the invention employs at least two sizes of concavities 5, one being relatively large and the other being relatively small. Preferably, the ratio of the area of each said large concavity 5 to each said small concavity 5 will be between about 5:1 and 10:1. Referring especially to the plan bottom view of FIG. 2, the large and small concavities 5 are arranged alternately in rows with each relatively large concavity having adjacent thereto four relatively small concavities. Moreover, for purposes of convenient forming and maximum strength, the concavities 5 employed in the acoustic damping structures of the invention will preferably be essentially circular. Also, by the term "plurality of concavities" is meant a population density of at least 50 concavities 5 per square foot of a major surface of the sheet form acoustic damping structure. In preferred embodiments of the invention, the population density of concavities 5 per square foot of sheet form structure will generally exceed 200.

In another preferred embodiment of the invention, at least 50 percent or, even more preferably, at least 90 percent of the population of concavities 5 will each be provided with a centrally located aperture 9 having a diameter of at least 0.01 inch, thereby to establish a discrete tunnel through which there is provided open communication between the chamber 10 (formed between the concavity 5 and the noise emitting surface to which the acoustic damping structure is affixed) and the exterior environment. In essence, the provision of said aperture 9 converts each concavity 5 so equipped into a form of Helmoholtz resonator and can contribute substantially to the acoustic damping efficiency of the sheet form damping structure of the invention.

The concavities 5 and, if employed, apertures 9 can be produced in the sheet lead starting material by any suitable technique, such as by machining, etching, milling, gouging or the like. However, each of these aforementioned techniques results in the removal of material from the starting sheet lead material and is, therefore, preferably to be avoided. Thus, it is much preferred that the concavities 5 be produced by pressing, indentation or deformation techniques, such as by embossing or otherwise impressing one major surface of the lead sheet 1 with concavities 5 to a depth sufficient to form corresponding protuberances 3 in the other major opposed surface of the lead sheet 1. Said protuberances 3 tend to desirably stiffen the overall structure without sacrifice of flexibility or ductility of the structure or the ability thereof to be conformed to curved or otherwise uneven noise emitting surfaces. Employing such pressing techniques there can also be generally achieved the punching of aperture 9 at the same time that the concavities 5 are being formed.

The acoustic damping structures hereinbefore described are affixed, with the concavity-bearing side down, to the noise producing surface in any suitable manner. For example, multiple fastening techniques may be employed such as riveting, nailing, stapling and the like. Also suitable are continuous bonding techniques such as cementing and soldering. However, it is generally more convenient to achieve the requisite fixation of the acoustic damping structure of the invention to the noise emitting surface by use of a suitable adhesive. Thus, in a preferred embodiment, the concavity-bearing major surface of the sheet form lead structure of the invention is provided with an adhesive coating 7. Even more preferably, said adhesive coating 7 is applied only to the interstices 6 of the concavity-bearing surface, which interstices normally exist as flat or line areas between the discrete concavities 5. Suitable adhesives include: thermoplastic urethane adhesives such as Supergrip 322; thermoset urethane adhesives such as Bostick 7132 or Bostick 7242C employing Boscodur No. 24 as a catalyst (all manufactured by USM Corp., Chemicals Division, Middleton, Mass.); epoxy adhesives such as equal weight mixtures of Epon 820 and Epon V 40, produced by Shell Chemical Company; nitrile adhesives such as Bostick 4045 (USM Corp.); thermoplastic cements such as Pliobond 20 or Paisley 98-MG156 or double-sided adhesive tapes or transfer sheets such as 3M No. 40 or Bear No. 660. Preferred for use in the damping structures of the invention are the so-called contact or pressure sensitive adhesives of which the thermoplastic cements, nitrile adhesives and double-sided adhesive and transfer tapes mentioned above as well as isobutylene adhesives are representative. Such contact adhesives are characterized by their ability to effectuate substantially immediate bonding of the damping structures of the invention to a great variety of noise emitting surfaces without the need for extraordinary special surface preparation and without the necessity for special bonding techniques to be employed. Thus, their use is to be looked upon primarily as a matter of substantial convenience.

As a practical example I have embossed 0.015 inch thick sheet lead material having a lead content of over about 97 weight percent in a manner similar to that depicted in the drawings, the formed sheet lead ware having relatively small circular concavities of about 0.25 inch diameter alternating with relatively large circular concavities of about 0.75 inch diameter, each said concavity having a depth of about 0.125 inch and being provided with a centrally located aperture 9 of about 0.060 inch diameter therethrough. The spacing of the concavities 5 was such that the population density thereof was about 360 concavities 5 per square foot of the major sheet lead surface containing them. Thus, the sum of the areas of the concavities 5 in the formed structure of the invention represented about 60 percent of the area of the major surface containing them.

The above-described sheet form product was affixed to the interior housing surfaces of several office equipment items, such as electric typewriters and teletype machines, said fixation being achieved by coating of the concavity-bearing major surface of the formed lead sheet product with a contact adhesive and by conforming and applying the thusly coated ware to the housing surface. This treatment of said office equipment items was found to result in substantial reductions in noise emitted therefrom during their respective operations.

What is claimed is:

1. An acoustic damping structure consisting essentially of a lead sheet having
   A. a lead content of at least 50 weight percent,
   B. a thickness of between 0.007 and 0.100 inch, and
   C. two major opposed surfaces; one of said major surfaces having a plurality of concavities therein, each concavity having an area of at least 0.01 inch$^2$, the sum of the areas of said concavities being at least 30 percent of the area of the one major surface containing them and the number of concavities being sufficient to provide a population density thereof of at least 50 concavities per square foot of said one major surface.

2. The acoustic damping structure of claim 1 wherein the sum of the areas of said concavities is at least 40 percent of the area of the one major surface containing them.

3. The acoustic damping structure of claim 1 wherein the population density of said concavities is at least 200 concavities per square foot of said one major surface.

4. The acoustic damping structure of claim 1 wherein concavities of at least two substantially different areas are employed, wherein the ratio of the larger area to the smaller area is between 5:1 and 10:1 and wherein the larger area concavities are in alternate array with the smaller area concavities.

5. The acoustic damping structure of claim 1 wherein at least 50 percent of the concavties are each provided with a substantially centrally located aperture therethrough.

6. The acoustic damping structure of claim 1 wherein at least 90 percent of the concavities are each provided with a substantially centrally located aperture therethrough.

7. The acoustic damping structure of claim 1 wherein said concavities in the one major surface of the lead sheet are formed by indentation thereof to a depth sufficient to form corresponding protuberances on the other major surface of said sheet.

8. The acoustic damping structure of claim 1 wherein the planar shape of each said concavity is essentially circular.

9. The acoustic damping structure of claim 1 wherein the interstices of the concavity-bearing major surface are coated with an adhesive.

10. The acoustic damping structure of claim 9 wherein said adhesive is a pressure sensitive adhesive.

* * * * *